3,224,883
AEROSOL TOPPING
Morton Pader and Sol D. Gershon, West Englewood, N.J., assignors to Lever Brothers Company, New York, N.Y., a corporation of Maine
No Drawing. Filed Oct. 1, 1962, Ser. No. 227,534
21 Claims. (Cl. 99—139)

The present invention relates to a composition for preparing whipped toppings, and, more particularly, it is concerned with aerosol whipped toppings.

It is known to provide an aqueous emulsion which has about 30–80% fat, 2–35% sugar, 5–30% non-fat milk solids and 3–20% of an emulsifier, and to pack the aforementioned aqueous emulsion in an aerosol can. This aerosol can also contains a soluble gas under pressure which provides the means for dispensing the contents therein to form an aerosol whipped topping. It is also known that such toppings can be made with vegetable proteins or caseinates and vegetable or animal fats, and that such toppings can also be made from natural cream by the use of appropriate stabilizing agents.

Certain problems have been encountered during the use of the prior art compositions, both those based on proteins and vegetable fats and those based on natural cream. For an aerosol topping to have ideal commercial utility, it must have certain characteristics. These include reasonable cost, ease of manufacture, stability for long periods of time under normal conditions of distribution, storage, and use in the home, pleasing organoleptic properties, freedom from bacteriological contamination and resistance to microbiological spoilage.

Aerosol toppings made from natural cream suffer certain drawbacks in these respects. Their shelf life, even under normal refrigeration, is fairly short because of the readiness with which they support bacterial growth. For long-term storage, they must either be held in the frozen state or be packed aseptically and maintained in this condition by the use of special types of valves. Both of these solutions to the problem introduce increased costs.

Prior art aerosol toppings made from protein and vegetable fats have other disadvantages. Not only are they in some instances easily spoiled by bacteriological attack, but they also lack flavor stability when commonly available vegetable proteins are used as the protein component and they undergo physical change when storage temperatures are cycled between freezing and room temperatures, yielding dispensed topping of inferior texture compared to the initial topping before storage. Also, in some instances, prior art compositions do not provide toppings with adequate foam stability, i.e., the foam collapses too rapidly after it is dispensed and it exhibits excessive syneresis.

The present invention provides an aerosol whipped topping which is resistant to bacteriological attack, it stable under conditions of normal refrigeration, is able to withstand extreme changes in storage temperature conditions without undergoing undesirable changes in texture and consistency, has excellent flavor and flavor stability, and can be readily prepared and distributed at reasonable cost.

It has been found that an unexpectedly improved product can be achieved by preparing a topping composition comprising a base fat, a casein material and a phosphoric acid ester composition. The ester composition must be selected from the group consisting of (1) those obtained by reacting a derivative of phosphorus with a mono- and/or diglyceride mixture obtained by superglycerinating a fat having an iodine value within the approximate range of 30 to 70, and, (2) those obtained by combining phosphoric acid esters prepared by separately reacting a derivative of phosphorus with a saturated and with an unsaturated mono- and/or diglyceride, the saturated glyceride resulting from super-glycerination of a fat having an iodine value below about 30, and the unsaturated mixture resulting from super-glycerination of a fat having an iodine value above about 70. An aqueous emulsion is formed from these ingredients, packed in an aerosol container with a soluble gas under pressure, and thereafter dispensed therefrom as desired.

In addition to the basic ingredients of base fat, casein material and the phosphoric acid ester composition, it has been found that the use of a polyoxyethylene sorbitan ester of a higher fatty acid as an additional emulsifier provides still further improved results.

It has also been found that incorporation of a process step which requires mixing of the casein material with the phosphoric acid ester prior to the mixing together of these and the remaining ingredients of the composition provides a product having improved resistance to changes caused by cyclic temperature variations during storage of the product in its container.

In the preferred embodiment of this invention, the product also includes a sweetening agent, a cellulose derivative, a pre-gelatinized starch, an alkaline earth metal halide, flavor, color, and sufficient edible acid to adjust the pH of the composition to the desired acid range.

The phosphoric acid ester compositions of this invention are formed by reacting a derivative of phosphorus with a mono- and/or diglyceride of a higher fatty acid, the phosphoric acid radical attaching to some or all of the free hydroxyl groups on the glyceride molecule. The derivatives of phosphorus within the purview of this invention are as follows: phosphorus pentoxide, pyrophosphoric acid, metaphosphate, phosphorus trioxides, phosphorus pentachloride, phosphorus oxychloride and the like. Process techniques which have been previously used to provide esters from phosphorus derivatives are described in U.S. Patents Nos. 2,026,785, 2,177,983 and 2,177,984, the disclosures of which are incorporated herein by reference.

The phosphoric acid ester compositions useful according to this invention are obtained by either of two general procedures. In the first and preferred method, a derivative of phosphorus is reacted with a glyceride obtained by super-glycerinating a triglyceride fat having an iodine value ranging from about 30 down to complete saturation of 1 or less. A derivative of phosphorus is also reacted, in a separate reaction, with a glyceride obtained by super-glycerinating a triglyceride fat having an iodine value of about 70 or higher. The phosphoric acid ester composition of this invention is then obtained by mixing these two reaction products in proportions ranging from about 1:3 to about 3:1 by weight, a 1:1 ratio being preferred.

Because of uncertainty concerning the nature and extent of the reaction forming the phosphoric acid esters, the phosphoric acid esters of this invention are defined in terms of the iodine value of the triglyceride fats from which they are derived.

As a second general method of obtaining phosphoric acid ester compositions according to this invention, a derivative of phosphoric acid is reacted with mono- and/or diglyceride mixtures obtained by super-glycerinating partially hydrogenated triglyceride fats having an iodine value within the approximate range of 30 to 70. The results obtained with this reaction product are somewhat less advantageous than the results obtained by separately reacting saturated and unsaturated components as described above, but are nevertheless fully satisfactory.

It will be noted that a combination of phosphoric acid esters is formed in both the first and second general methods described above. The first method provides esters of saturated fatty acid glycerides and of unsaturated fatty acid glycerides in separate reactions, and these are subsequently combined by mixing. In the second method, the partially hydrogenated mono-diglyceride mixture contains both saturated and unsaturated fatty acid glycerides, and both are available to form esters with the phosphoric acid provided by the phosphorus derivative.

The phosphoric acid ester compositions obtained as above are used at a total ester concentration of about 0.1% to 2%, preferably about 0.3% to 1%.

The glycerides used to prepare the phosphoric acid ester compositions of this invention can be a pure monoglyceride, a mixture of pure mono-glycerides, or a mixture of mono- and diglycerides. It is also preferable to have similar or substantially the same fatty acid residues in the mono-glycerides and in the mono- and diglyceride mixture, although this is not essential.

The reasons for employing a combination of phosphoric acid esters prepared from both saturated and unsaturated components, rather than a single one, are several. If, for example, only an essentially unsaturated ester is used, i.e., one prepared from a mono- and/or diglyceride mixture from a triglyceride fat having an iodine value above about 70, the topping does not dispense smoothly, is too dry and short rather than creamy, and the emulsion may tend to become firm in the can during storage and thus be relatively incompletely dispensed. On the other hand, if only an essentially saturated ester is used, i.e., one prepared with a mono-diglyceride mixture from a triglyceride having an iodine value below about 30, the dispensed topping may be too dense and marshmallow-like in texture, rather than light and fluffy.

The chain length of the fatty acid portion of the ester can vary depending upon the oil used to prepare the mono- and diglycerides. Generally, mixtures are employed containing fatty acid residues with chain lengths of primarily 14 to 18 carbon atoms. Suitable materials include mono-diglyceride mixtures obtained from cottonseed oil by conventional super-glycerination techniques, and mono-diglyceride concentrates obtained from hydrogenated lard and from unhydrogenated cottonseed oil by molecular distillation techniques.

As mentioned above, the use of a polyoxyethylene sorbitan ester of a saturated higher fatty acid in combination with the phosphoric acid esters of this invention provides additional improved characteristics in the final product. Suitable materials of this class include polyoxyethylene sorbitan monostearate, polyoxyethylene sorbitan tristearate, and polyoxyethylene sorbitan tripalmitate.

The advantages of the use of this class of compounds are particularly evident with phosphoric acid esters prepared by reacting the phosphorus derivative with partially hydrogenated mono-diglyceride mixtures having an iodine value within the approximate range of 30 to 70. When used, the polyoxyethylene sorbitan esters of a higher fatty acid are employed at a level of about 0.1 to 0.5% of the completed emulsion, and are additive to the phosphoric acid esters, which are employed in the same compositions at levels ranging from 0.1 to 2.0%.

When the polyoxyethylene soribtan esters are used with the phosphoric acid esters obtained by separately reacting saturated and unsaturated components, as described above, ratios of saturated to unsaturated components in the final mixture of phosphoric acid esters may be as high as 5:1, 10:1 or higher.

In the discussion above relating to the preparation of the phosphoric acid esters of this invention, reference was made to super-glycerinated triglyceride fats. It will be recognized that suitable mono- and/or diglycerides may also be obtained by reacting mixtures of free fatty acids with glycerine, with appropriate adjustment of the relative saturation of the free fatty acid mixture. The term super-glycerinated fat, as used in the claims, is intended to include this well-known equivalent.

The aforementioned phosphoric acid esters are used with about 15% to 40% of base fat, and about 0.1 to 3.0% of a casein material with the balance being water and other optional components.

A base fat is incorporated into a topping mix to impart the desired creamy-mouth feel. Fats for this invention should have a capillary melting point in the range of about 35° to 40° C. Suitable fats include partially hydrogenated soybean oil having an iodine value of about 80, partially hydrogenated cottonseed oil having an iodine value of 74, mixtures of fully hydrogenated coconut oil with partially hydrogenated cottonseed oil having an iodine value of 65, and the like.

The partially hydrogenated base fats referred to in the preceding paragraph are preferably prepared by the so-called selective hydrogenation technique. Selective hydrogenation techniques are well-known in the art, and generally indicate that a relatively high temperature is employed with a spent nickel catalyst. This technique provides a hydrogenated fat with a relatively sharp melting point, which is preferred in fats for use in aerosol whipped toppings.

The casein material in the compositions of this invention include isoelectric casein, sodium caseinate and calcium caseinate. When the isoelectric casein is used, it must be adjusted to the proper pH value either prior to or after it is incorporated into the topping emulsion. The amount of casein material used is important in determining both the characteristics of the dispensed foam and the stability of the emulsion to wide variations in storage temperature. Generally, about 0.1 to 3.0% of the casein material is used, preferably about 0.1–0.6%. At higher sodium caseinate levels, the emulsion tends to be less stable to temperature cycling, e.g., from −10° F. to 45° F. to 70° F and back to 45° F. (approximately normal refrigerator temperature). At these high levels, the emulsion during temperature cycling tends to become curdy, and does not dispense from the can as completely as it should or with as good a texture as it possessed initially. Even at high sodium caseinate levels, however, the emulsion is quite stable when alternated between −10° F. and 45° F., or between 45° F. and 70° F.

The amount of soluble protein present is of importance, as well as the total amount of protein. By soluble protein is meant the protein that is in the emulsion as a stable colloidal dispersion, i.e., one which cannot be removed from suspension by centrifugation at about 2000 g. While it has not been possible to measure accurately the actual amount of soluble protein in the emulsion itself, it has been noted that at a pH of 5.0 to 5.7, some of the protein is precipitated in aqueous dispersion. By either raising or lowering the pH of the emulsion, one can provide either more or less soluble protein.

It is known in the art that the lower the pH of a food product, the more resistant that product will be to bacteriological attack. It has been suggested, for example in U.S. Patent No. 3,010,830, that adjusting the pH of a whipped topping to about 6.2 provides adequate protection in this regard. This conclusion could not be confirmed, and it was found that a considerably lower pH is required for this purpose, i.e., about 5.0 to 5.7. Casein has only limited solubility at low pH values, as low as 5.0, and it was thus very surprising to find that an acceptable aerosol topping could be obtained employing it. To this end, it is preferred to choose a casein material with a certain, if only minor, degree of solubility at a pH as low as 5.

It is noted above that isoelectric casein can be used. Concerning the use of this ingredient, it was surprising to find that a material of such apparent low solubility could effect emulsion stability. Nonetheless, this material not only yields a topping emulsion, but an emulsion with superior stability to radical changes in storage temperature. Use of isoelectric casein alone, however, results in an emulsion which when dispensed tended to become wet and collapse too readily. This effect is overcome by the addition of as little as 0.05% of sodium caseinate or by storage of the packaged topping for a short period, which presumably allows solubilization of some of the osoelectric casein.

It is desirable in some instances to add a small amount of an alkaline earth halide, such as CaCl₂. This gives the packaged topping improved stability with respect to alternate freezing and thawing of the emulsion. Excessive amounts of this type of salt adversely affect the texture of the dispensed topping, making it too foamy and loose in structure. CaCl₂ should not be used at a level in excess of about 0.05%.

The topping composition of this invention also preferably includes a sweetening agent such as sucrose, corn sugar, lactose and the like. Artificial sweeteners such as a saccharine or a cyclamate can also be used. The amount of sweetening agent used varies according to taste.

Additional ingredients employed in the preferred composition include small amounts of carbohydrate materials such as gums and starches, which have a bodying and waterbinding effect. Carboxymethylcellulose, and/or starches such as rice, potato, corn, tapioca, preferably pregelatinized, significantly improves the ability of the emulsion to withstand freezing and thawing without adverse effects.

One of the major advantages of the composition of this invention is the compatibility of the phosphoric acid esters with casein materials, and that this combination retains its effectiveness at low pH values. The pH of the emulsion prepared according to this invention can be adjusted as low as pH 5, with attendant improvement in bacteriological stability of the product. The actual pH used will depend in part on the type of flavor employed. For flavors such as vanilla, the pH is preferably not reduced below 5.3. An edible acid, such as citric, tartaric and lactic can be used for this purpose.

The aerosol whipped topping is formed by homogenizing an aqueous emulsion with the various ingredients therein. After sterilization at elevated temperatures with subsequent cooling, the emulsion is packed in an aerosol can. This can is pressured with a propellent comprising a suitable gas or mixture of gases, e.g., nitrous oxide, with or without some carbon dioxide, and/or octafluorocyclobutane.

As an additional feature of this invention, it has been found that in order to obtain maximum emulsion stability under conditions of a wide range of storage temperatures, e.g., cycling between −10° F. and 70° F., it is necessary to prepare the emulsion by a special sequence of steps. Caseinate tends to lump when added to water, and therefore it is desirable to add it admixed with other non-lumping ingredients or with water-insoluble ingredients, such as sugar or fat, respectively. When the caseinate was dispersed in the fat along with the emulsifying ingredients and stabilizers, and this mixture added to the water and sugar, an emulsion was obtained which, although excellent initially or during constant temperature refrigerated storage, did not withstand temperature cycling well; the foam texture became poor after such cycling and the emulsion could not be dispensed from the can as completely as it could be initially. However, an aqueous solution of the casein was mixed with the phosphoric acid esters of the mono and/or diglycerides prior to combining these ingredients with the remainder of the ingredients, and it was unexpectedly found that the resulting emulsion had excellent stability with respect to cycling temperature storage. The reason for this phenomenon is unknown. It may be postulated that the mechanism of functioning of the caseinate and phosphate ester involves the formation of a complex between the two; this is theory, however.

Thus, in accordance with the present invention, it is now possible to provide an aerosol whipped topping which is creamy and has excellent texture. Furthermore, the aerosol whipped topping has prolonged flavors and bacteriological stability, and can undergo freezing and thawing conditions without adverse effects.

The following examples are submitted to illustrate but not to limit this invention. Unless otherwise indicated, all parts and percentages in the specification are based upon weight.

EXAMPLE I

The following formulation was provided.

| Components: | Wt. percent |
|---|---|
| Coconut oil, hydrogenated to I.V. of 1 | 12.5 |
| Cottonseed oil, hydrogenated to 65 I.V. | 12.5 |
| PAEM [1] | 0.35 |
| Polyoxyethylene sorbitan tristearate (Tween 65) | 0.25 |
| Calcium caseinate | 0.60 |
| Sucrose | 10.5 |
| Carboxymethylcellulose, Hercules 70-high viscosity | 0.1 |
| Pregelatinized starch | 1.0 |
| Calcium chloride | 0.025 |
| Flavor. | |
| Color. | |
| Lactic acid (to pH 5.7). | |
| Water, to 100%. | |

[1] Phosphoric acid esters prepared by reacting P₂O₅ with a mixture of mono- and diglycerides obtained from selectively hydrogenated cottonseed oil of 65 I.V.

This formulation was packed at the rate of 9½ oz. in a 16 oz. can and was pressurized with 7 gms. of a mixture of 85% nitrous oxide with 15% carbon dioxide. This packed formulation, when discharged from the can, had excellent foam, flavor and texture. The foam therefrom had an overrun of over 350% and only collapsed 32% in one hour at room temperature (as determined by measuring the height of a 38 mm. truncated cone of foam initially and after one hour). No syneresis occurred during this hour. The same desirable characteristics were evident in the product after a period of storage in a frozen condition.

By using 2–3 grams of octafluorocyclobutane in lieu of part of the N₂O—CO₂ admixture, the foam possessed even greater stability.

EXAMPLE II

An emulsion was formed from the components indicated herebelow.

| Components: | Wt. percent |
|---|---|
| Cottonseed oil, hydrogenated to 74 I.V. | 30.0 |
| PAEM, saturated [1] | 0.3 |
| PAEM, unsaturated [2] | 0.3 |
| Sucrose | 10.5 |
| Sodium caseinate | 0.3 |
| Carboxymethylcellulose, 70 high viscosity, Hercules | 0.2 |
| Color. | |
| Flavor. | |
| Lactic acid (to pH 5.7). | |
| Water, to 100%. | |

[1] Phosphoric acid ester prepared by reacting P₂O₅ with lard mono-glycerides, molecularly distilled, from hydrogenated lard of 1 I.V.
[2] Phosphoric acid ester prepared by reacting P₂O₅ with cottonseed oil mono-glycerides, molecularly distilled, from cottonseed oil of 110 I.V.

This emulsion was packed and pressurized in accordance with the procedure described in Example I. The dispensed foam had the following properties: excellent flavor and texture; an overrun of 425%; a collapse of 29% in one hour at room temperature; and little or no syneresis.

EXAMPLE III

A formulation was prepared with the following ingredients.

Ingredient: Wt. percent
- Coconut oil, hydrogenated to 1 I.V. _____ 12.5
- Cottonseed oil, hydrogenated to 65 I.V. _____ 12.5
- PAEM [1] _____ 0.525
- Polyoxyethylene sorbitan tristearate (Tween 65) _____ 0.15
- Carboxymethylcellulose, 70 high viscosity, Hercules _____ 0.10
- Pregelatinized starch _____ 1.00
- Liquid sucrose (67° Brix) _____ 15.67
- Sodium caseinate _____ 0.40
- Calcium chloride (10% aqueous solution) __ 0.25
- Flavor.
- Color.
- Lactic acid (to pH 5.3–5.4).
- Water, to 100%.

[1] Phosphoric acid esters of 65 I.V. cottonseed oil mono-diglycerides.

This formulation was prepared in two ways:

(A) The sodium caseinate was added to half of the water at 120–130° F. and stirred until dissolved. While agitating vigorously, the PAEM at 140–150° F. was added slowly. The Tween 65, starch and carboxymethylcellulose were then added to the oil and mixed therewith thoroughly at 125–135° F. In a separate tank, the remaining water and sugar were mixed. The temperature was then adjusted to 120–130° F. The caseinate/PAEM mixture was added with agitation, followed by the CaCl₂ and the flavor ingredients. The pH was then adjusted to 5.4 with edible acid (e.g. lactic acid). The oil mix was next added, and distributed throughout by agitation. The crude emulsion was sterilized by means of a tubular heat exchanger, cooled, homogenized, and filled into aerosol cans. The product was pressurized with nitrous oxide and stored in a refrigerator.

(B) Process A was followed, except that the caseinate was admixed with the oil mixture to facilitate its dispersion, rather than being added in the manner described for Process A.

Both products initially were excellent in texture and flavor, and there was no trouble in dispensing either one relatively completely. Each was thereafter subjected to three temperature cycles: (1) from 45° to −10° to 45° F., (2) from 45° to 70° to 45° F., and (3) from 45° to −10° to 45° to 70° to 45° F. Time at each temperature was sufficient to allow temperature equilibrium. Both products showed essentially no change after being subjected to cycles 1 and 2. Only the product made by Process A, however, withstood cycle 3 successfully. The product made by Process B tended to dispense with difficulty and was less fluid in the can. An excessive amount of the emulsion remained in the can prepared by Process B. Both products, however, were considered to be of commercial quality. The Process A product was preferred because it was able to withstand more rigorous storage conditions.

EXAMPLE IV

A product was made as in Example III(A), except that there were added 0.1% sodium caseinate, plus 0.5% dried isoelectric precipitated casein, instead of 0.4% sodium caseinate, and the pH was adjusted to 5.3 with alkali as appropriate. This product was like that in Example III(A), and was able to undergo extreme temperature changes (from −10° to 70° to 45° F.) with essentially no alteration in foam texture, ease of dispensing, flavor or other characteristics.

EXAMPLE V

Four other types of emulsions were formed and tested in accordance with the procedure promulgated in Example I. The various emulsifiers were tested over a range of levels. Even at the apparent optimum level, however, these emulsions gave inferior results as evidenced in Table 1 herebelow.

Table 1

| Emulsion No. | Emulsifiers used | Protein used | Fats used | Remarks |
| --- | --- | --- | --- | --- |
| 1 | (a), (b) | (f) | (h) | Off-flavor developed on prolonged storage. |
| 2 | (c), (b) | (f) | (h) | Off-flavor developed on prolonged storage; poor foam quality in general. |
| 3 | (a), (b) | (g) | (h), (i) | Tended to become difficult to dispense on storage. |
| 4 | (d), (e) | (g) | (h), (i), (j) | Rapid foam collapse; foam was marshmallowlike; did not withstand freezing. |

(a) Sorbitan monostearate (Span 60).
(b) Polyoxyethylene (20) sorbitan monostearate (Tween 60).
(c) Partially hydrogenated cottonseed oil monoglycerides (65 I.V).
(d) Stearine monoglyceride (cottonseed oil, hydrogenated to 1 I.V).
(e) Lecithin.
(f) Soy, isolated, non-hydrolyzed.
(g) Sodium caseinate.
(h) Partially hydrogenated cottonseed oil, 74 I.V.
(i) Coconut oil, hydrogenated to 1 I.V.
(j) Coconut oil.

It is recognized that various well-known emulsifying agents may be added to the basic emulsifying compositions of this invention for their recognized and additive effect, and it is to be understood that such compositions are within the scope of the present invention. Having set forth the general nature and specific embodiments of the present invention, the true scope is now particularly pointed out in the appended claims.

What is claimed is:

1. An edible whippable topping composition with excellent storage stability confined under pressure in an aerosol dispensing container which is capable of being dispensed from the pressurized container to provide a stable whipped topping that is similar to whipped cream comprising a base fat, a casein material and a phosphoric acid ester composition selected from the group consisting of (1) those obtained by reacting a derivative of phosphorus with a mono- and/or diglyceride mixture obtained by super-glycerinating a fat having an iodine value within the approximate range of 30 to 70, and (2) those obtained by combining phosphoric acid esters prepared by separately reacting a derivative of phosphorus with a saturated and with an unsaturated mono- and/or diglyceride, the saturated glyceride resulting from super-glycerination of a fat having an iodine value below about 30, and the unsaturated mixture resulting from super-glycerination of a fat having an iodine value above about 70.

2. An edible whippable topping composition with excellent storage stability confined under super-atmospheric pressure in an aerosol dispensing container which is capable of being dispensed from the pressurized container to provide a stable whipped topping that is similar to whipped cream comprising an aqueous emulsion of a base fat, a casein material, a phosphoric acid ester composition selected from the group consisting of (1) those obtained by reacting a derivative of phosphorus with a mono- and/or diglyceride mixture obtained by super-glycerinating a fat having an iodine value within the approximate range of 30 to 70, and (2) those obtained by combining phosphoric acid esters prepared by separately reacting a derivative of phosphorus with a saturated and with an unsaturated mono- and/or diglyceride, the saturated glyceride resulting from super-glycerination of a fat having an iodine value below about 30, and the unsaturated mixture resulting from super-glycerination of a fat having an iodine value above about 70, and a soluble pressurizing gas, the aqueous emulsion and gas being confined in a container under super-atmospheric pressure.

3. An aerosol whipped topping provided from the composition of claim 1.

4. The composition of claim 1, wherein the pH is within the range of about 5.0 to 5.7.

5. An edible whippable topping composition with excellent storage stability confined under pressure in an aerosol dispensing container which is capable of being dispensed from the pressurized container to provide a stable whipped topping that is similar to whipped cream comprising a base fat, a casein material and a phosphoric acid ester composition prepared by reacting a derivative of phosphorus with a mono- and/or diglyceride mixture obtained by super-glycerinating a fat having an iodine value within the range of about 30 to 70.

6. The composition of claim 5, which includes a polyoxyethylene sorbitan ester of a saturated higher fatty acid.

7. The composition of claim 5, in which the derivative of phosphorus is selected from the group consisting of phosphorus pentoxide, pyrophosphoric acid, meta-phosphoric acid, phosphorus halides, ethyl meta-phosphate and phosphorus oxychloride.

8. An edible whippable topping composition with excellent storage stability confined under pressure in an aerosol dispensing container which is capable of being dispensed from the pressurized container to provide a stable whipped topping that is similar to whipped cream comprising an aqueous emulsion of a base fat, a casein material, and a phosphoric acid ester composition prepared by mixing the separate reaction products of a derivative of phosphorus with a saturated and with an unsaturated mono- and/or diglyceride, the saturated glyceride resulting from super-glycerination of a fat having an iodine value of about 30 or less, and the unsaturated glyceride resulting from super-glycerination of a fat having an iodine value above about 70.

9. The composition of claim 8 comprising about 15–40% of the base fat, about 0.1–3% of the casein material and about 0.1–2% of the phosphoric acid ester composition, the proportion of saturated to unsaturated components of the ester composition being within the range of about 3:1 to 1:3.

10. An edible whippable topping composition with excellent storage stability confined under pressure in an aerosol dispensing container which is capable of being dispensed from the pressurized container to provide a stable whipped topping that is similar to whipped cream comprising an aqueous emulsion of about 15–40% of a base fat, about 0.1–3% of a casein material and about 0.1–2% of a phosphoric acid ester composition selected from the group consisting of (1) those obtained by reacting a derivative of phosphorus with a mono- and/or diglyceride mixture obtained by super-glycerinating a fat having an iodine value within the approximate range of 30 to 70, and (2) those obtained by combining phosphoric acid esters prepared by separately reacting a derivative of phosphorus with a saturated and with an unsaturated mono- and/or diglyceride, the saturated glyceride resulting from super-glycerination of a fat having an iodine value below about 30, and the unsaturated mixture resulting from super-glycerination of a fat having an iodine value above about 70.

11. An edible whippable topping composition with excellent storage stability confined under pressure in an aerosol dispensing container which is capable of being dispensed from the pressurized container to provide a stable whipped topping that is similar to whipped cream comprising an aqueous emulsion of a base fat, a sweetening agent, a casein material, a pre-gelatinized starch, sufficient edible acid to adjust the pH of the composition to about 5.0–5.7 and a phosphoric acid ester composition selected from the group consisting of (1) those obtained by reacting a derivative of phosphorus with a mono- and/or diglyceride mixture obtained by super-glycerinating a fat having an iodine value within the approximate range of 30 to 70, and (2) those obtained by combining phosphoric acid esters prepared by separately reacting a derivative of phosphorus with a saturated and with an unsaturated mono- and/or diglyceride, the saturated glyceride resulting from super-glycerination of a fat having an iodine value below abotu 30, and the unsaturated mixture resulting from super-glycerination of a fat having an iodine value above about 70.

12. The composition of claim 11 which additionally comprises a polyoxyethylene sorbitan ester of a saturated higher fatty acid.

13. An edible whippable topping composition with excellent storage stability confined under pressure in an aerosol dispensing container which is capable of being dispensed from the pressurized container to provide a stable whipped topping that is similar to whipped cream comprising an aqueous emulsion of the base fat, a sweetening agent, a casein material, a cellulose derivative, a pre-gelatinized starch, an alkaline earth metal halide, sufficient edible acid to adjust the pH of the composition to about 5.0–5.7 and a phosphoric acid ester composition selected from the group consisting of (1) those obtained by reacting a derivative of phosphorus with a mono- and/or diglyceride mixture obtained by super-glycerinating a fat having an iodine value within the approximate range of 30 to 70, and (2) those obtained by combining phosphoric acid esters prepared by separately reacting a derivative of phosphorus with a saturated and with an unsaturated mono- and/or diglyceride, the saturated glyceride resulting from super-glycerination of a fat having an iodine value below about 30, and the unsaturated mixture resulting from super-glycerination of a fat having an iodine value above about 70.

14. An edible whippable topping composition with excellent storage stability confined under pressure in an aerosol dispensing container which is capable of being dispensed from the pressurized container to provide a stable whipped topping that is similar to whipped cream comprising an aqueous emulsion of 15–40% of a base fat, 0.5–15% of a sweetening agent, 0.1–3% of a casein material, about 1% of a pre-gelatinized starch, 0.1–0.2% of carboxymethylcellulose, 0.1–0.5% of a polyoxyethylene sorbitan ester of a higher fatty acid and 0.1–2% of a phosphoric acid ester composition selected from the group consisting of (1) those obtained by reacting a derivative of phosphorus with a mono- and/or diglyceride mixture obtained by super-glycerinating a fat having an iodine value within the approximate range of 30 to 70, and (2) those obtained by combining phosphoric acid esters prepared by separately reacting a derivative of phosphorus with a saturated and with an unsaturated mono- and/or diglyceride, the saturated glyceride resulting from super-glycerination of a fat having an iodine value below about 30, and the unsaturated mixture resulting from super-glycerination of a fat having an iodine value above about 70, the pH of the composition being adjusted to 5.0–5.7 with an edible acid.

15. A process for preparing an edible whippable topping composition with excellent storage stability confined under pressure in an aerosol dispensing container which is capable of being dispensed from the pressurized container to provide a stable whipped topping that is similar to whipped cream comprising the steps of mixing a casein material with a phosphoric acid ester composition selected from the group consisting of (1) those obtained by reacting a derivative of phosphorus with a mono- and/or diglyceride mixture obtained by super-glycerinating a fat having an iodine value within the approximate range of 30 to 70, and (2) those obtained by combining phosphoric acid esters prepared by separately reacting a derivative of phosphorus with a saturated and with an unsaturated mono- and/or diglyceride, the saturated glyceride resulting from super-glycerination of a fat having an iodine value below about 30, and the unsaturated mixture resulting from super-glycerination of a fat having an iodine value above about 70, in the presence of water prior to combining these ingredients with the remaining ingredients of the composition, and thereafter forming an emulsion.

16. A stable aerosol whipped topping that is similar to whipped cream and that is dispensed from an aerosol container comprising a base fat, a casein material and a phosphoric acid ester composition selected from the group consisting of (1) those obtained by reacting a derivative of phosphorus with a mono- and/or diglyceride mixture obtained by super-glycerinating a fat having an iodine value within the approximate range of 30 to 70 and (2) those obtained by combining phosphoric acid esters prepared by reacting separately a derivative of phosphorus with a saturated and with an unsaturated mono- and/or diglyceride; said saturated glyceride resulting from super-glycerination of a fat having an iodine value below about 30 and said unsaturated glyceride resulting from super-glycerination of a fat having an iodine value above about 70.

17. An edible whippable topping composition with excellent storage stability confined under pressure in an aerosol dispensing container which is capable of being dispensed from the pressurized container to provide a stable whipped topping that is similar to whipped cream comprising an aqueous emulsion of a base fat, a casein material and a phsphoric acid ester composition selected from the group consisting of (1) those obtained by reacting a derivative of phosphorus with a mono- and/or diglyceride mixture obtained by super-glycerinating a fat having an iodine value within the approximate range of 30 to 70 and (2) those obtained by combining phosphoric acid esters prepared by reacting separately a derivative of phosphorus with a saturated and with an unsaturated mono- and/or diglyceride; said saturated glyceride resulting from super-glycerination of a fat having an iodine value below about 30 and said unsaturated glyceride resulting from super-glycerination of a fat having an iodine value above about 70; said emulsion having a pH within the range of about 5.0 to 5.7.

18. A process for preparing an edible whippable topping composition with excellent storage stability confined under pressure in an aerosol dispensing container which is capable of being dispensed from the pressurized container to provide a stable whipped topping that is similar to whipped cream which comprises mixing in water a casein material with a phosphoric acid ester composition selected from the group consisting of (1) those obtained by reacting a derivative of phosphorus with a mono- and/or diglyceride mixture obtained by super-glycerinating a fat having an iodine value within the approximate range of 30 to 70 and (2) those obtained by combining phosphoric acid esters prepared by reacting separately a derivative of phosphorus with a saturated and with an unsaturated mono- and/or diglyceride, said saturated glyceride resulting from super-glycerination of a fat having an iodine value below 30 and said unsaturated glyceride resulting from super-glycerination of a fat having an iodine value above about 70; combining said aqueous mixture of casein material and phosphoric acid ester composition with a base fat to form an emulsion; and pressurizing said emulsion with a soluble pressurizing gas to provide said aerosol whippable topping composition.

19. A process to form an edible whippable topping composition with excellent storage stability confined under pressure in an aerosol dispensing container which is capable of being dispensed from the pressurized container to provide a stable whipped topping that is similar to whipped cream which comprises reacting a derivative of phosphorus with the saturated glyceride resulting from super-glycerination of a fat having an iodine value below about 30; reacting separately a derivative of phosphorus with the unsaturated mixture resulting from super-glycerination of a fat having an iodine value above about 70; and combining the separately prepared reaction products with a base fat and a casein material to provide an aqueous emulsion.

20. A process to form an edible whippable topping composition with excellent storage stability confined under pressure in an aerosol dispensing container which is capable of being dispensed from the pressurized container to provide a stable whipped topping that is similar to whipped cream which comprises reacting a derivative of phosphorus with a mono- and/or diglyceride mixture obtained by super-glycerinating a fat having an iodine value within the approximate range of 30 to 70; and combining the reaction products with a base fat and a casein material to provide an aqueous emulsion.

21. An edible whippable topping composition with excellent storage stability confined under pressure in an aerosol dispensing container which is capable of being dispensed from the pressurized container to provide a stable whipped topping that is similar to whipped cream comprising a soluble pressurizing gas mixture of about 85% nitrous oxide with about 15% carbon dioxide and an aqueous emulsion of about 30 parts cottonseed oil hydrogenated to 74 I.V., about 0.3 parts phosphoric acid ester prepared by reacting $P_2O_5$ with lard mono-glycerides molecularly distilled from hydrogenated lard of 1 I.V., about 0.3 parts phosphoric acid ester prepared by reacting $P_2O_5$ with cottonseed oil mono-glycerides molecularly distilled from cottonseed oil of 110 I.V., about 10.5 parts sucrose, about 0.3 part sodium caseinate and about 0.2 part carboxymethylcellulose, the aqueous emulsion and gas being confined in a container under super-atmospheric pressure.

References Cited by the Examiner
UNITED STATES PATENTS

| | | | |
|---|---|---|---|
| 2,177,984 | 10/1939 | Harris | 260—403 |
| 2,829,978 | 4/1958 | Castagna et al. | 99—139 |
| 2,868,653 | 1/1959 | Diamond et al. | 99—139 |
| 2,883,286 | 4/1959 | Musser | 99—139 |
| 2,914,410 | 11/1959 | Butler | 99—139 |

A. LOUIS MONACELL, *Primary Examiner.*

BEATRICE H. STRIZAK, *Examiner.*